(12) United States Patent
Chen

(10) Patent No.: US 10,780,942 B1
(45) Date of Patent: Sep. 22, 2020

(54) PEDAL STRUCTURE

(71) Applicant: Chung-I Chen, Taichung (TW)

(72) Inventor: Chung-I Chen, Taichung (TW)

( * ) Notice: Subject to any disclaimer, the term of this patent is extended or adjusted under 35 U.S.C. 154(b) by 0 days.

(21) Appl. No.: 16/677,000

(22) Filed: Nov. 7, 2019

(51) Int. Cl.
    B62M 3/08 (2006.01)
(52) U.S. Cl.
    CPC ..................................... B62M 3/08 (2013.01)
(58) Field of Classification Search
    CPC ............................... B62M 3/08; B62M 3/086
    See application file for complete search history.

(56) References Cited

U.S. PATENT DOCUMENTS

| | | | | |
|---|---|---|---|---|
| 4,838,115 | A * | 6/1989 | Nagano ..................... | B62M 3/08 74/594.4 |
| 8,327,723 | B2 * | 12/2012 | Roudergues ............. | B62M 3/08 73/862.51 |
| 10,093,386 | B2 * | 10/2018 | Winefordner .......... | B62M 3/086 |

FOREIGN PATENT DOCUMENTS

| | | | | |
|---|---|---|---|---|
| DE | 202013004398 U1 * | 5/2013 | ............. | B62M 3/08 |
| TW | I646006 B | 1/2019 | | |

* cited by examiner

*Primary Examiner* — Thomas C Diaz
(74) *Attorney, Agent, or Firm* — Muncy, Geissler, Olds & Lowe, P.C.

(57) ABSTRACT

A pedal structure includes a pedal body, a first bearing, a stopping element, a central axle, and a fixing element. The pedal body has a receiving space, and a fixing hole is formed at an end of the receiving space. A first stepped face is formed around the fixing hole. The first bearing is received in the receiving space and abuts against the first stepped face. The stopping element is received in the receiving space and abuts against the first bearing and is engaged with the inner wall of the receiving space. The central axle is inserted through the stopping element and the first bearing. The fixing element is inserted through the fixing hole to engage with the central axle to pull the central axle toward the first bearing.

9 Claims, 4 Drawing Sheets

PEDAL STRUCTURE

BACKGROUND OF THE INVENTION

Field of the Invention

The present invention relates to a pedal.

Description of the Prior Art

A pedal assembly includes a pedal body and an central axle for connecting to a crank, and the central axle is rotatably inserted through the pedal body. The pedal body usually forms a tube-shaped receiving space for insertion of the central axle. To facilitate rotation of the pedal body with respect to the central axle, bearings are usually arranged between the pedal body and the central axle. The opening of the receiving space is sealed by a cover.

A conventional structure is shown in patent TW 1646006. The central axle and the bearings are placed into an inner sleeve in advance for fixation, and the inner sleeve is inserted into the receiving space. If the receiving space has the opening only at a single end, the tool is impossible to insert into the receiving space for rotating the central axle for fixation. Thus, the central axle has to be positioned in the inner sleeve in advance. As a result, the pedal structure is heavy and thick.

Besides, even if the receiving space has openings at both ends, the opening has to be formed on a vertical surface for screwing the bolt. Thus, the appearance of the pedal body is restricted and has to be rectangle.

SUMMARY OF THE INVENTION

The main object of the present invention is to provide a pedal structure having fewer elements to be lighter and thinner.

To achieve the above and other objects, the pedal structure of the present invention includes a pedal body, at least one first bearing, a stopping element, a central axle, and a fixing element.

The pedal body has a receiving space penetrating through along a horizontal direction. The receiving space has a first end and a second end along the horizontal direction. A fixing hole is formed at the first end of the receiving space. The receiving space has a first stepped face near the first end. The first stepped face is annular to surround the fixing hole and facing the second end. The receiving space further has an engaging portion on an inner wall thereof. The first stepped face is located between the engaging portion and the fixing hole.

The at least one first bearing has an external diameter larger than an internal diameter of the fixing hole and has an internal diameter smaller than the internal diameter of the fixing hole. The at least one first bearing is inserted into the receiving space via the second end of the receiving space and abuts against the first stepped face.

The stopping element is arranged in the receiving space and abuts against an end of the at least one first bearing facing the second end. The stopping element is further engaged with the engaging portion to prevent the at least one first bearing from leaving the receiving space via the second end of the receiving space.

The central axle has a third end and a fourth end along an axial direction thereof. The central axle has a bearing section near the third end. The central axle is inserted into the receiving space via the second end of the receiving space with the third end thereof wherein the bearing section is inserted through the at least one first bearing. The central axle has a fixing portion at a terminal end of the third end. The fourth end of the central axle is adapted for connecting to a crank.

The fixing element is inserted through the fixing hole and is connected to the fixing portion of the central axle to pull the central axle toward the first end.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
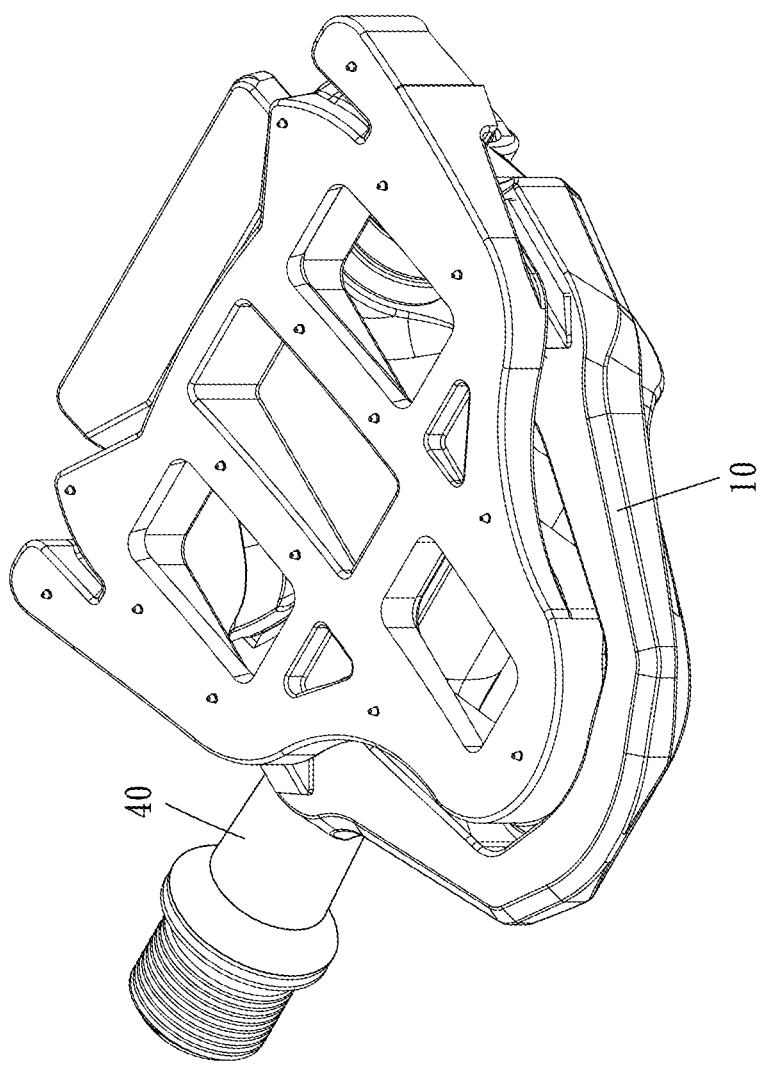
FIG. 1 is a stereogram of the present invention.
Figure 2:
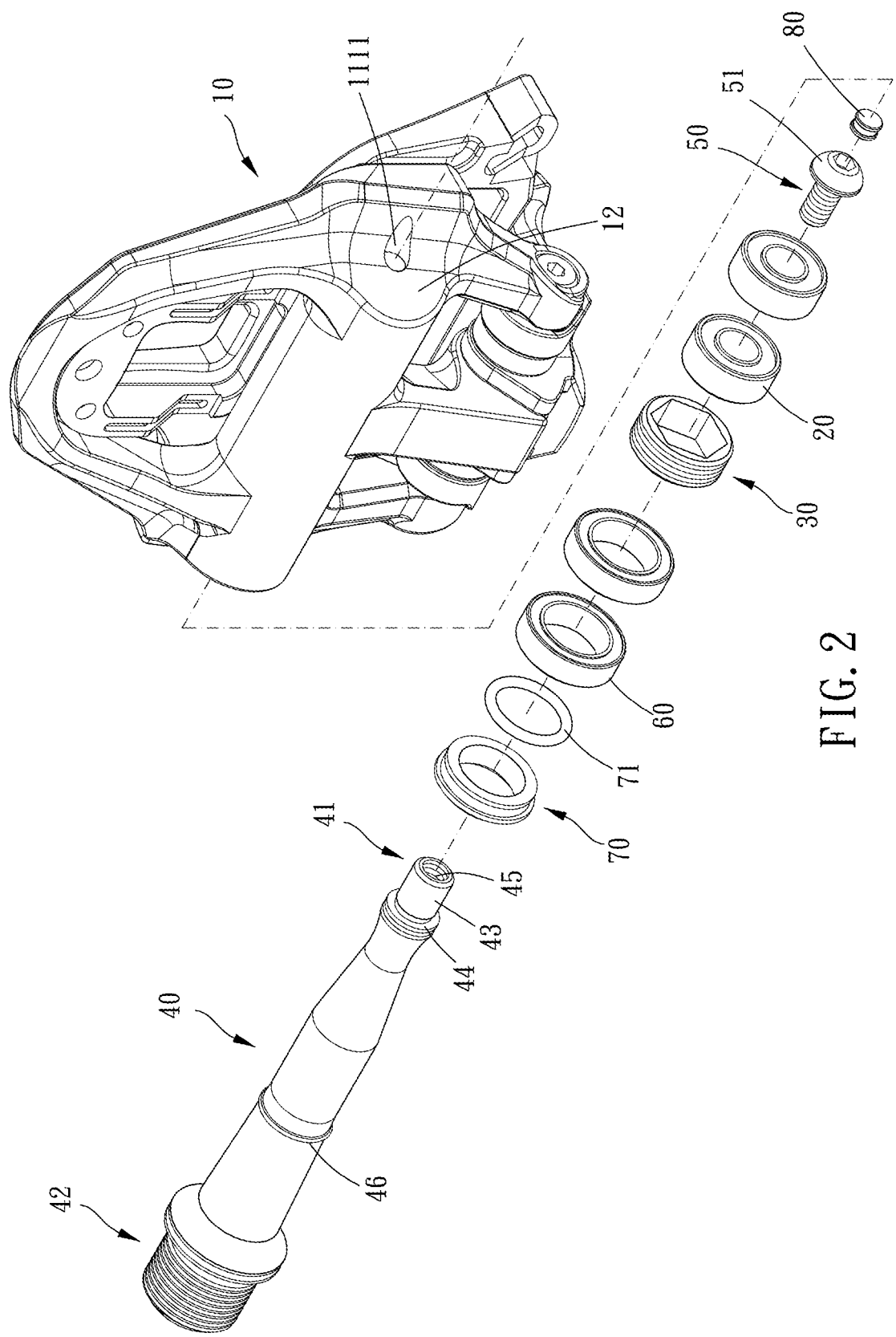
FIG. 2 is a breakdown drawing of the present invention.
Figure 3:
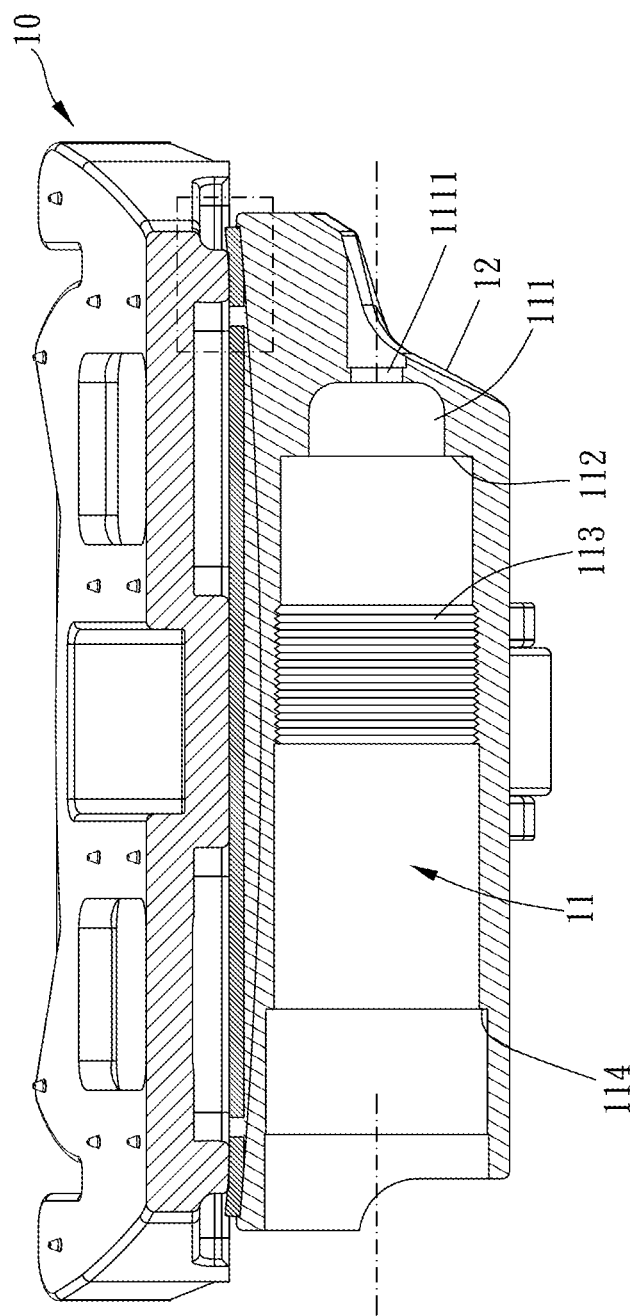
FIG. 3 is a profile showing a pedal body of the present invention.
Figure 4:
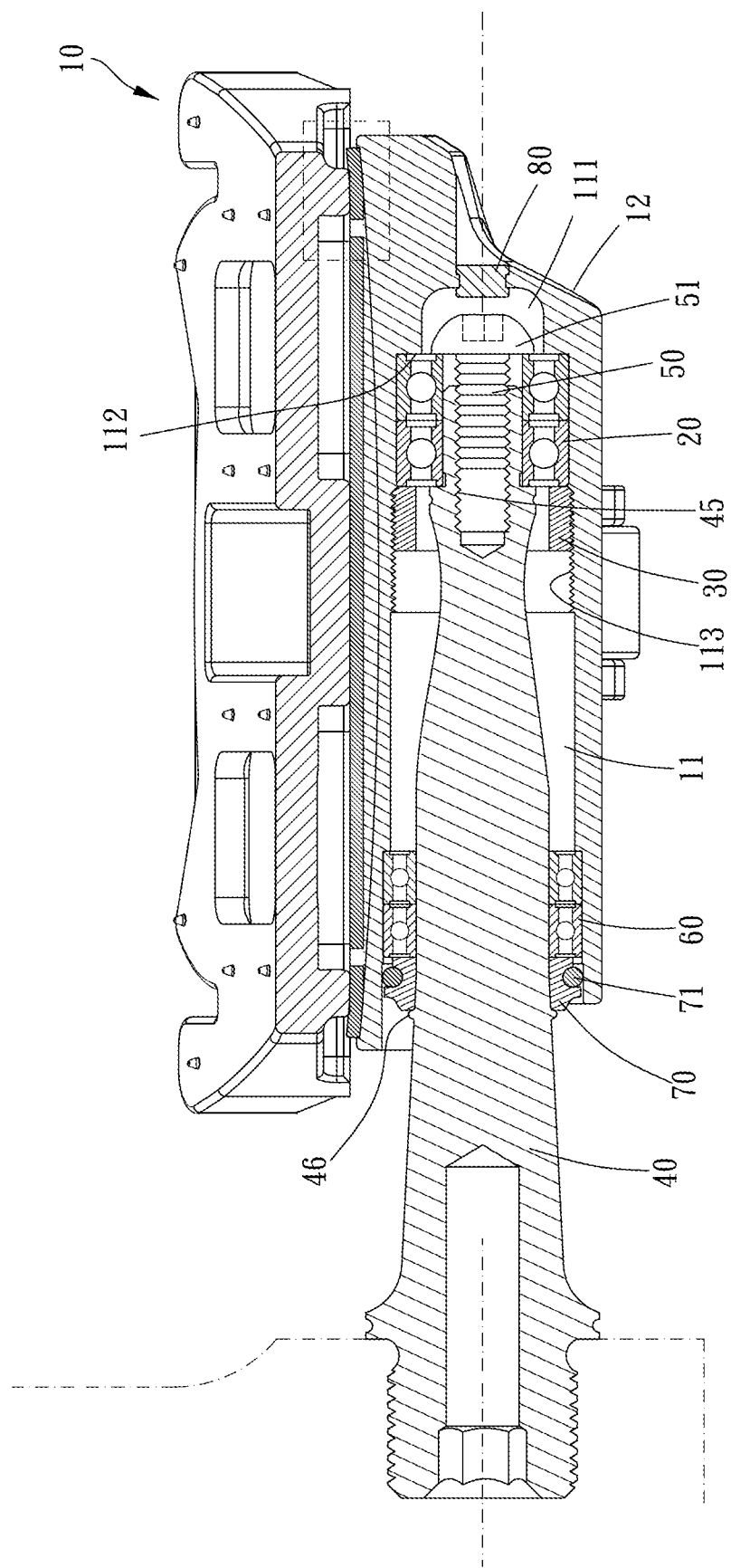
FIG. 4 is a profile of the present invention.

Please refer to FIG. 1 to FIG. 4, the pedal structure of the present invention includes a pedal body 10, at least one first bearing 20, a stopping element 30, a central axle 40, and a fixing element 50. In the present embodiment, the at least one first bearing 20 includes two said first bearings 20, and each of the first bearings 20 is a ball bearing.

The pedal body 10 has a receiving space 11 penetrating through along a horizontal direction. The receiving space 11 has a first end and a second end along the horizontal direction. A fixing hole 111 is formed at the first end of the receiving space 11. The receiving space 11 has a first stepped face 112 near the first end. The first stepped face 112 is annular to surround the fixing hole 111 and facing the second end. The receiving space 11 further has an engaging portion 113 on an inner wall thereof. The first stepped face 112 is located between the engaging portion 113 and the fixing hole 111.

The at least one first bearing 20 has an external diameter larger than an internal diameter of the fixing hole 111 and has an internal diameter smaller than the internal diameter of the fixing hole 111. The at least one first bearing 20 is inserted into the receiving space 11 via the second end of the receiving space 11 and abuts against the first stepped face 112.

The stopping element 30 is arranged in the receiving space 11 and abuts against an end of the at least one first bearing 20 facing the second end. The stopping element 30 is further engaged with the engaging portion 113 to prevent the at least one first bearing 20 from leaving the receiving space 11 via the second end of the receiving space 11. In the present embodiment, the engaging portion 113 is an internal threaded section. The stopping element 30 is annular and has external threads on an outer surface thereof to screw with the engaging portion 113. However, in other possible embodiments, the engaging portion can have an internal diameter which is reduced axially to tight-fit with the stopping element. Besides, the inner wall of the stopping element 30 forms a polygonal hole. Thereby, a screwdriver can be used to screw the stopping element 30 to the engaging portion 113.

The central axle 40 has a third end 41 and a fourth end 42 along an axial direction thereof. The central axle 40 has a bearing section 43 near the third end 41. The central axle 40 is inserted into the receiving space 11 via the second end of the receiving space 11 with the third end thereof wherein the bearing section 43 is inserted through the at least one first bearing 20. The central axle 40 has a fixing portion 45 at a terminal end of the third end 41. The fourth end 42 of the central axle 40 is adapted for connecting to a crank. Specifically, the minimum internal diameter of the stopping element 30 is larger than the external diameter of the central axle 40 at a position corresponding to the stopping element 30 so that a gap is formed between the stopping element 30 and the central axle 40.

The fixing element 50 is inserted through the fixing hole 111 and is connected to the fixing portion 45 of the central axle 40 to pull the central axle 40 toward the first end.

Preferably, a blocking hole with smaller internal diameter is formed at an end of the fixing hole remote from the second end. More preferably, the internal diameter of the blocking hole 1111 is smaller than the external diameter of the head portion 51 of the fixing element 50. The blocking hole is adapted for a tool to insert through to reach the fixing hole for operating the fixing element. The blocking hole is inserted with a blocking cover. The fixing portion 45 is a threaded hole extending axially. The fixing element 50 is a bolt to screw with the fixing portion 45. Specifically, the fixing element 50 is inserted through the first bearing 20 and placed into the receiving space 11 via the second end with the first bearing 20 so that the head portion 51 of the fixing element 50 is inserted through the fixing hole 111. When the stopping element 30 and the central axle 40 are placed into the receiving space 11, use a tool to insert through the fixing hole 111 to rotate the fixing element 50 for fixation of the central axle 40. In the present embodiment, the pedal body 10 is formed with an arc concave face 12 inclined and facing downward. The blocking hole 1111 is formed on the concave face 12 to make the blocking hole 111 hard to be seen.

In the present embodiment, the pedal structure further includes at least one second bearing 60 (preferably two said second bearings 60 wherein each of them is a ball bearing) and a rear blocking element 70 which is annular. The receiving space 11 has a second stepped face 114 near the second end. The second stepped face 114 faces the second end. The at least one second bearing 60 is sleeved onto the central axle 40 to be received in the receiving space 11 and abuts against the second stepped face 114. The rear blocking element 70 is sleeved onto the central axle 40 and abuts against an end of the at least one second bearing 60 near the second end. The rear blocking element 70 is engaged with the inner wall of the receiving space 11 to prevent the at least one second bearing 60 from leaving the receiving space 11 via the second end. Preferably, the central axle 40 is formed with an annular rib 46 on a circumferential face thereof. The annular rib 46 is adapted for abutting against an end of the rear blocking element 70 near the second end so as to prevent the rear blocking element 70 from leaving the receiving space 11 via the second end. Besides, an o-ring 71 is sleeved onto the rear blocking element 70 to ensure that the rear blocking element 70 seals the receiving space 11.

When assembling, the fixing element 50 is inserted through the first bearing 20, and the fixing element 50 and the first bearing 20 are placed into the receiving space 11 via the second end. Thereafter, the stopping element 30 is placed into the receiving space 11 via the second end and is screwed with the engaging portion 113 by a screwdriver from the second end. And then, the second bearing 60 and the rear blocking element 70 are sleeved onto the central axle 40, and they are placed into the receiving space 11 via the second end. The fixing element 50 is rotated by a tool via the blocking hole 1111 so that the central axle 40 is pulled toward the first end. Thereby, the annular rib 46 of the central axle 40 abuts against the rear stopping element 70, and the assembling is finished.

In conclusion, the stopping element is engaged with the pedal body, so the elements such as the bearings can be placed into the receiving space to complete the installation. Thereby, the inner sleeve is not necessary anymore, and the pedal becomes lighter and thinner. In addition, the fixing element is placed into the receiving space via the second end and is rotated from the first end, so the fixing element is not exposed. Furthermore, the blocking cover and the rear blocking element seal the receiving space from two ends so that dust and moisture are not allowed to enter the receiving space. Besides, the fixing element is not exposed, so the contour of the pedal body can have a surface which is not vertical (such as arc face or inclined face), so it is possible to have various designs.

What is claimed is:
1. A pedal structure, including:
a pedal body, having a receiving space penetrating through along a horizontal direction, the receiving space having a first end and a second end along the horizontal direction, a fixing hole being formed at the first end of the receiving space, the receiving space having a first stepped face near the first end, the first stepped face being annular and facing the second end, the receiving space further having an engaging portion on an inner wall thereof, the first stepped face being located between the engaging portion and the fixing hole;
at least one first bearing, having an external diameter larger than an internal diameter of the fixing hole, having an internal diameter smaller than the internal diameter of the fixing hole, the at least one first bearing being inserted into the receiving space via the second end of the receiving space and abutting against the first stepped face;
a stopping element, arranged in the receiving space and abutting against an end of the at least one first bearing facing the second end, the stopping element being further engaged with the engaging portion to prevent the at least one first bearing from leaving the receiving space via the second end of the receiving space;
a central axle, having a third end and a fourth end along an axial direction thereof, the central axle having a bearing section near the third end, the central axle being inserted into the receiving space via the second end of the receiving space with the third end thereof wherein the bearing section is inserted through the at least one first bearing, the central axle having a fixing portion at a terminal end of the third end, the fourth end of the central axle being adapted for connecting to a crank;
a fixing element, the fixing element being inserted through the fixing hole and being connected to the fixing portion of the central axle to pull the central axle toward the first end;
wherein the bearing section has an abutting stepped face at an end thereof near the fourth end, the abutting stepped face faces the third end, the abutting face abuts against the end of the at least one first bearing facing the second end, the fixing element has a head portion, the head portion abuts against an end of the at least one bearing near the first end so as to pull the central axle toward the first end.

2. The pedal structure of claim 1, further including at least one second bearing and a rear blocking element which is annular, the receiving space having a second stepped face near the second end, the second stepped face facing the second end, the at least one second bearing being sleeved onto the central axle to be received in the receiving space and abutting against the second stepped face, the rear blocking element being sleeved onto the central axle and abutting against an end of the at least one second bearing near the second end, the rear blocking element being engaged with the inner wall of the receiving space to prevent the at least one second bearing from leaving the receiving space via the second end.

3. The pedal structure of claim 2, wherein the central axle is formed with an annular rib on a circumferential face thereof, the annular rib is adapted for abutting against an end of the rear blocking element near the second end so as to prevent the rear blocking element from leaving the receiving space via the second end.

4. The pedal structure of claim 2, wherein an o-ring is sleeved onto the rear blocking element.

5. The pedal structure of claim 1, wherein the engaging portion is an internal threaded section, the stopping element is annular and has an external threads to screw with the engaging portion.

6. The pedal structure of claim 5, wherein an inner wall of the stopping element forms a polygonal hole.

7. The pedal structure of claim 1, wherein a blocking hole with smaller internal diameter is formed at an end of the fixing hole remote from the second end, the blocking hole is adapted for a tool to insert through to reach the fixing hole for operating the fixing element, the blocking hole is inserted with a blocking cover.

8. The pedal structure of claim 6, wherein the fixing portion is a threaded hole extending axially, the fixing element is a bolt to screw with the fixing portion.

9. The pedal structure of claim 8, wherein the pedal structure further includes at least one second bearing and a rear blocking element which is annular, the receiving space has a second stepped face near the second end, the second stepped face faces the second end, the at least one second bearing is sleeved onto the central axle to be received in the receiving space and abuts against the second stepped face, the rear blocking element is sleeved onto the central axle and abutting against an end of the at least one second bearing near the second end, the rear blocking element is engaged with the inner wall of the receiving space to prevent the at least one second bearing from leaving the receiving space via the second end; the central axle is formed with an annular rib on a circumferential face thereof, the annular rib is adapted for abutting against an end of the rear blocking element near the second end so as to prevent the rear blocking element from leaving the receiving space via the second end; an o-ring is sleeved onto the rear blocking element; the at least one first bearing includes two said first bearings, the at least one second bearing includes two said second bearings; each of the first bearings and each of the second bearings are ball bearings respectively; a minimum internal diameter of the stopping element is larger than an external diameter of the central axle at a position corresponding to the stopping element; the pedal body is formed with an arc concave face facing downward on an outer surface thereof, the blocking hole is formed on the concave face.

* * * * *